United States Patent
Stoker et al.

(10) Patent No.: US 8,346,790 B2
(45) Date of Patent: *Jan. 1, 2013

(54) DATA INTEGRATION METHOD AND SYSTEM

(75) Inventors: Sandra L. Stoker, Allentown, PA (US); Ahmad Tariq Sharif, New Hope, PA (US); Michael E. Prevoznak, Lebanon, NJ (US); Christopher John Lucas, Atlantic Highlands, NJ (US); Charles R. Benke, Macungie, PA (US); Maria P. Seckler, Warren, NJ (US); Alan Duckworth, Wescoville, PA (US)

(73) Assignee: The Dun & Bradstreet Corporation, Short Hills, NJ (US)

( * ) Notice: Subject to any disclaimer, the term of this patent is extended or adjusted under 35 U.S.C. 154(b) by 67 days.

This patent is subject to a terminal disclaimer.

(21) Appl. No.: 12/892,496

(22) Filed: Sep. 28, 2010

(65) Prior Publication Data

US 2011/0055173 A1 Mar. 3, 2011

Related U.S. Application Data

(63) Continuation of application No. 10/368,072, filed on Feb. 18, 2003, now Pat. No. 7,822,757.

(51) Int. Cl.
*G06F 7/00* (2006.01)
*G06F 17/00* (2006.01)
*G06F 17/30* (2006.01)

(52) U.S. Cl. .................. 707/758; 707/736; 707/826

(58) Field of Classification Search .................. None
See application file for complete search history.

(56) References Cited

U.S. PATENT DOCUMENTS

| | | | |
|---|---|---|---|
| 5,588,147 A | 12/1996 | Neeman et al. | |
| 5,754,938 A * | 5/1998 | Herz et al. | 725/116 |
| 5,806,074 A | 9/1998 | Souder et al. | |
| 5,835,087 A * | 11/1998 | Herz et al. | 715/810 |
| 5,960,430 A | 9/1999 | Haimowitz et al. | |
| 7,403,942 B1 * | 7/2008 | Bayliss | 707/748 |
| 7,483,871 B2 * | 1/2009 | Herz | 1/1 |

(Continued)

FOREIGN PATENT DOCUMENTS

| | | |
|---|---|---|
| EP | 1102225 | 5/2001 |
| WO | WO0210968 | 2/2002 |

OTHER PUBLICATIONS

Board of Appeal's Request for Written Argument dated Sep. 2, 2011 corresponding to Japanese Patent Application No. 2006-502895.

(Continued)

*Primary Examiner* — Susan Chen
(74) *Attorney, Agent, or Firm* — Ohlandt, Greeley, Ruggiero & Perle, LLP.

(57) ABSTRACT

A computer implemented method for ensuring the quality of processed corporate entity data, the method comprising: sequentially processing the corporate entity data through a series of serially connected drivers, the serially connected drivers comprise a data collection driver, an entity matching driver, an identification number driver, a corporate linkage driver, and a predictive indicator driver; and conducting a quality assurance of the corporate entity data as it is processed in each of the driver, wherein the quality assurance comprises: (i) sampling the corporate entity data from each the driver periodically, thereby generating sample data; (ii) evaluating the sample data; and (iii) adjusting the processing based upon the evaluation, thereby producing high quality data.

9 Claims, 19 Drawing Sheets

U.S. PATENT DOCUMENTS

| | | | |
|---|---|---|---|
| 7,822,757 B2 * | 10/2010 | Stoker et al. | 707/758 |
| 7,953,219 B2 * | 5/2011 | Freedman et al. | 379/265.06 |
| 2002/0133507 A1 | 9/2002 | Holenstein et al. | |
| 2002/0161778 A1 | 10/2002 | Linstedt | |
| 2002/0191452 A1 | 12/2002 | Fujihara | |
| 2003/0033155 A1 | 2/2003 | Peerson et al. | |
| 2003/0061232 A1 | 3/2003 | Patterson | |

OTHER PUBLICATIONS

"Robust Annotation Positioning in Digital Documents," by: Gupta, Brush, Bargeron and Cadiz, Published Sep. 22, 2000. ftp://ftp.research.mircrosoft.com/pub/tr/tr-2000-95.pdf.

European Search Report dated Oct. 13, 2006 based on corresponding PCT Application No. PCT/US2004/001435, 3pp.

* cited by examiner

DATA INTEGRATION METHOD AND SYSTEM

CROSS-REFERENCED APPLICATIONS

This application is a continuation application and claims priority to U.S. patent application Ser. No. 10/368,072, filed on Feb. 18, 2003.

BACKGROUND OF THE INVENTION

1. Field of the Invention

The present invention relates to a method of data processing and, more particularly, to a method of processing data associated with businesses.

2. Description of the Related Art

To be successful, businesses need to make informed decisions. In risk management, businesses need to understand and manage total risk exposure. They need to identify and aggressively collect on high-risk accounts. In addition, they need to approve or grant credit quickly and consistently. In sales and marketing, businesses need to determine the most profitable customers and prospects to target, as well as incremental opportunity in an existing customer base. In supply management, businesses need to understand the total amount being spent with suppliers to negotiate better. They also need to uncover risks and dependencies on suppliers to reduce exposure to supplier failure.

The success of these business decisions depends largely on the quality of the information behind them. Quality is determined by whether the information is accurate, complete, timely, and consistent. With thousands of sources of data available, it is a challenge to determine which is the quality information a business should rely on to make decisions. This is particularly true when businesses change so frequently. In the next thirty minutes, 120 businesses addresses will change, 75 business telephone numbers will change or be disconnected, 30 new businesses will open their doors, 20 chief executive officers (CEOs) will leave their jobs, 15 companies will change their names, and 10 businesses will close.

Conventional methods of providing business data are incomplete. Some providers collect incomplete data, fail to completely match entities, have incomplete numbering systems that recycle numbers, fail to provide corporate family information or provide incomplete corporate family information, and merely provide incomplete value-added predictive data. It is an object of the present invention to provide more complete and accurate business data. This includes complete and accurate data collection, entity matching, identification number assignment, corporate linkage, and predictive indicators. This completeness and accuracy produces high quality business information that businesses trust and depend on for making business decisions.

SUMMARY OF THE INVENTION

A computer implemented method for ensuring the quality of processed corporate entity data, the method comprising: sequentially processing the corporate entity data through a series of serially connected drivers, the serially connected drivers comprise a data collection driver, an entity matching driver, an identification number driver, a corporate linkage driver, and a predictive indicator driver; and conducting a quality assurance of the corporate entity data as it is processed in each of the driver, wherein the quality assurance comprises: (i) sampling the corporate entity data from each the driver periodically, thereby generating sample data; (ii) evaluating the sample data; and (iii) adjusting the processing based upon the evaluation, thereby producing high quality data.

The method for evaluating of the sample data consists of at least one step selected from the group consisting of: auditing, validating, normalizing, correcting, and updating of the corporate entity data.

Preferably, the corporate entity data is initially processed through the data collection driver to produce primary corporate entity data, the primary corporate entity data is then processed by the entity matching driver, the primary corporate entity data is processed by the entity matching driver where if not matched to previously stored data, then the unmatched primary corporate entity data is sent to the identification number driver where an identification number is assigned thereto, and if matched to the previously stored data, then the matched primary corporate entity data from the entity matching driver and/or primary corporate entity data having an assigned identification number applied in the identification number driver are processed by the corporate linkage driver, and thereafter the primary corporate entity data from the corporate linkage driver is processed by the predictive indicator driver.

The data collection driver mergers the corporate entity data from a variety of sources. The entity matching driver matches the corporate entity data with a stored identification number. The identification number driver assigns an identification number to the corporate entity data that was number matched in by the entity matching driver. The corporate linkage driver builds corporate families based upon the corporate entity data which has been matched or assigned the identification number. The predictive indicator driver uses statistical analysis to rate an entity's past performance to indicate the likelihood that the entity will perform the same way in the future.

A computer system for ensuring the quality of processed corporate entity data, the system comprising:
  a data collection driver;
  an entity matching driver;
  an identification number driver;
  a corporate linkage driver
  a predictive indicator driver; and
  a processor which sequentially filters the corporate entity data through the serially connected data collection driver, entity matching driver, identification number driver, corporate linkage driver, and predictive indicator driver, and
    wherein the processor conducts a quality assurance of the corporate entity data as it is processed in each of the driver, wherein the quality assurance comprises:
      sampling the corporate entity data from each the driver periodically, thereby generating sample data;
      evaluating the sample data; and
      adjusting the processing based upon the evaluation, thereby producing high quality data.

A machine-readable medium storing executable instructions for data integration, the instructions comprising:
  sequentially processing the corporate entity data through a series of serially connected drivers, the serially connected drivers comprise a data collection driver, an entity matching driver, an identification number driver, a corporate linkage driver, and a predictive indicator driver; and
  conducting a quality assurance of the corporate entity data as it is processed in each of the driver, wherein the quality assurance comprises:
    sampling the corporate entity data from each the driver periodically, thereby generating sample data;
    evaluating the sample data; and adjusting the processing based upon the evaluation, thereby producing high quality data.

These and other features, aspects, and advantages of the present invention will become better understood with reference to the drawings, description, and claims.

DESCRIPTION OF THE INVENTION

In the following detailed description, reference is made to the accompanying drawings. These drawings form a part of this specification and show, by way of example, specific preferred embodiments in which the present invention may be practiced. These embodiments are described in sufficient detail to enable those skilled in the art to practice the present invention. Other embodiments may be used and structural, logical, and electrical changes may be made without departing from the spirit and scope of the present invention. Therefore, the following detailed description is not to be taken in a limiting sense and the scope of the present invention is defined only by the appended claims.

Figure 1:
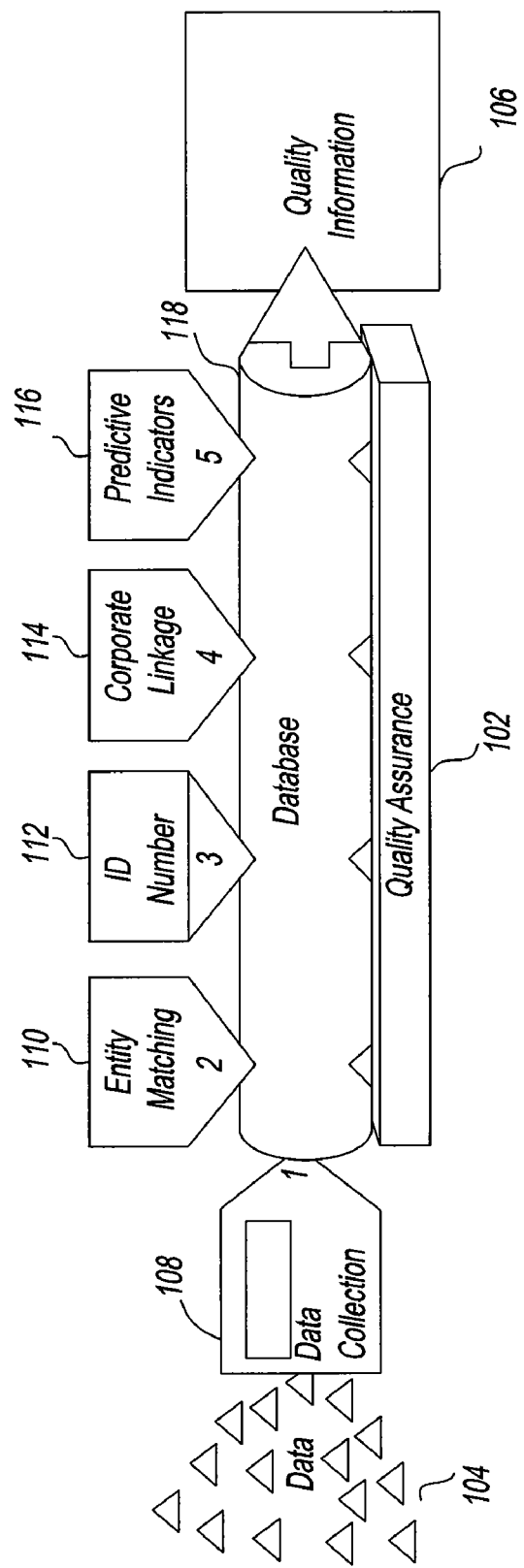
FIG. 1 is a block diagram of the method of data integration according to the present invention.

FIG. 1 shows an overview of a method of data processing according to the present invention. The foundation of the method is quality assurance 102, which is the continuous data auditing, validating, normalizing, correcting, and updating done to ensure quality all along the process. There are five quality drivers that work sequentially to enhance the incoming data 104 to turn it into quality information 106. These five drivers are: a data collection driver 108, an entity matching driver 110, an identification (ID) number driver 112, a corporate linkage driver 114, and a predictive indicators driver 116. These five drivers access a database 118. Database 118 is an organized collection of data and database management tools, such as a relational database, an object-oriented database, or any other kind of database. Data in database 118 is continually refined and enhanced based on customer feedback in quality assurance and global data collection.

Data collection driver 108 brings together data from a variety of sources worldwide. Then, the data is integrated into database 118 through entity matching driver 110, resulting in a single, more accurate picture of each business entity. Next, identification number driver 112 applies an identification number as a unique means of identifying and tracking a business globally through any changes it goes through. Corporate linkage driver 114 then builds corporate families to enable a view of total corporate risk and opportunity. Finally, predictive indicators driver 116 uses statistical analysis to rate a business' past performance and indicate the likelihood that it will perform the same way in the future.

Figure 2:
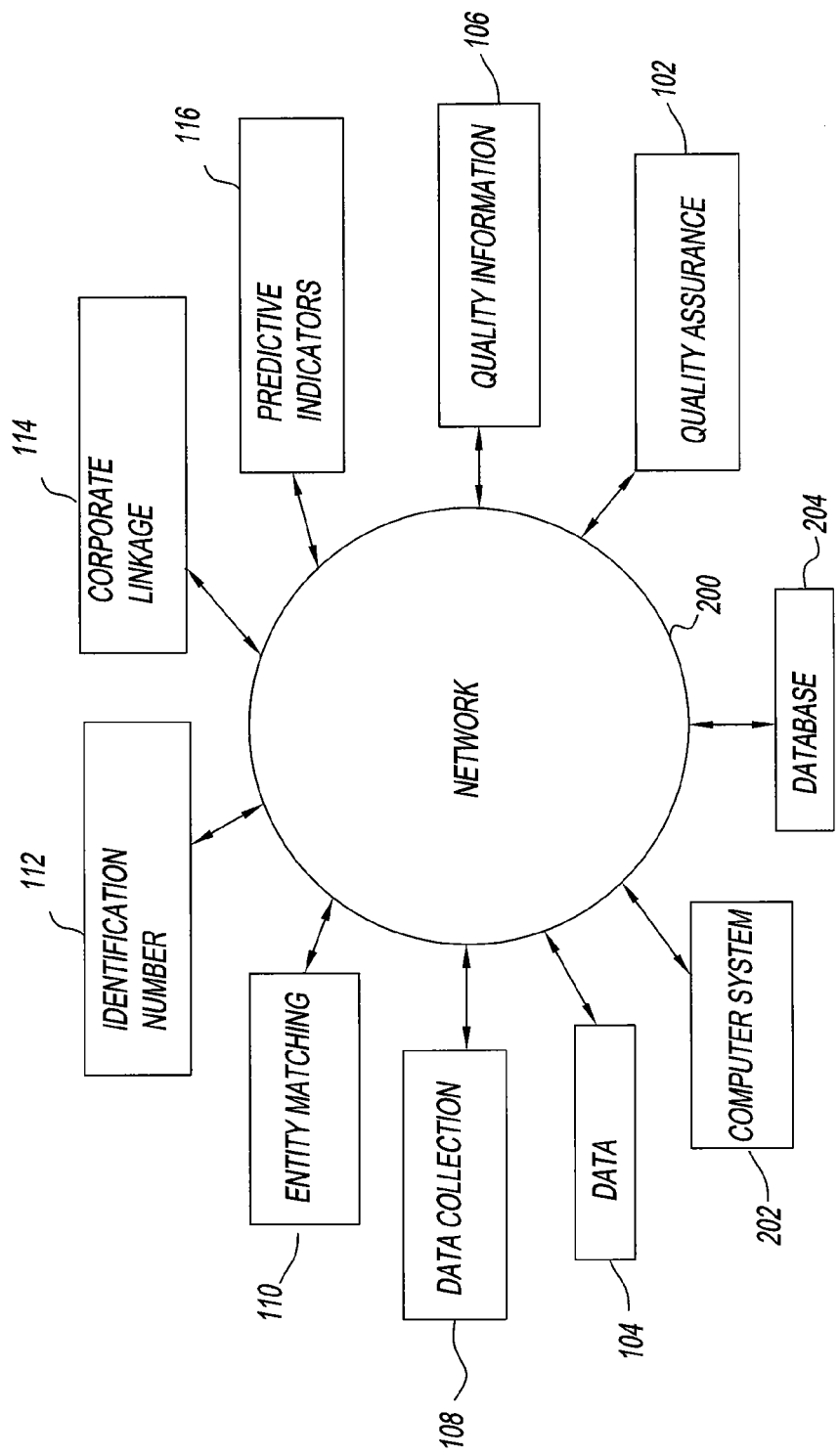
FIG. 2 is a block diagram of a system for data integration according to the present invention.
Figure 3:
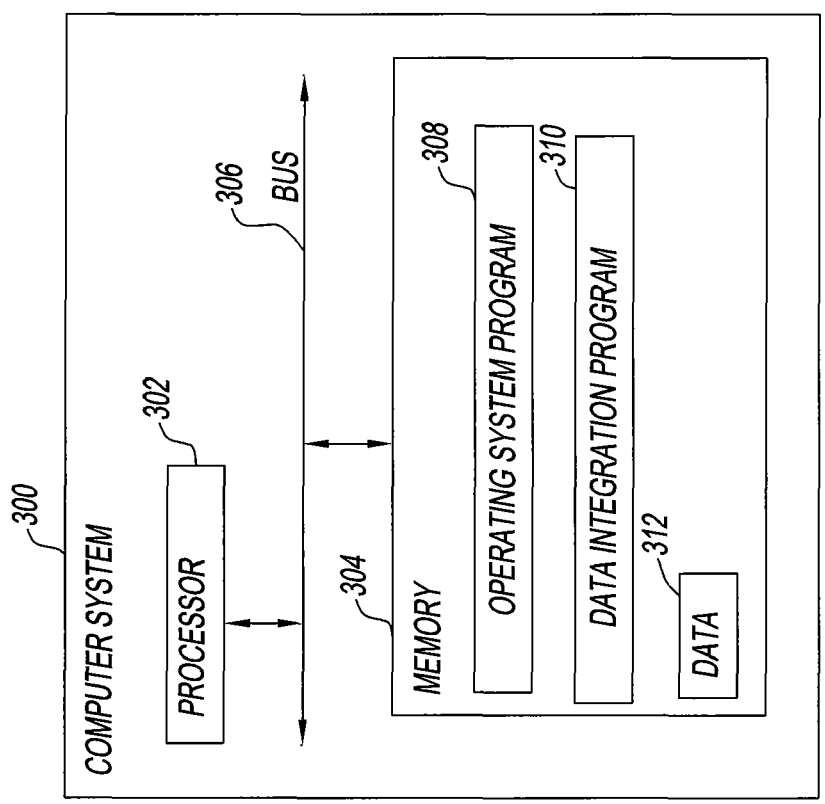
FIG. 3 is a block diagram of a system for data integration according to the present invention.

FIGS. 2 and 3 show two example embodiments of systems for data integration according to the present invention, although other systems would also be suitable for practicing the present invention. FIG. 2 shows a network configuration while FIG. 3 shows a computer system configuration. In FIG. 2, a network 200 facilitates communication among the other system components, including a computer system 202. The five quality drivers, data collection driver 108, entity matching driver 110, identification number driver 112, corporate linkage driver 114, and predictive indicators driver 116, and quality assurance 102 work sequentially to enhance the incoming data 104 to turn it into quality information 106 stored in database 204. In FIG. 3, a computer system 300 has a processor 302 with access to memory 304 via a bus 306. Memory 304 stores an operating system program 308, a data integration program 310, and data 312.

Figure 4:
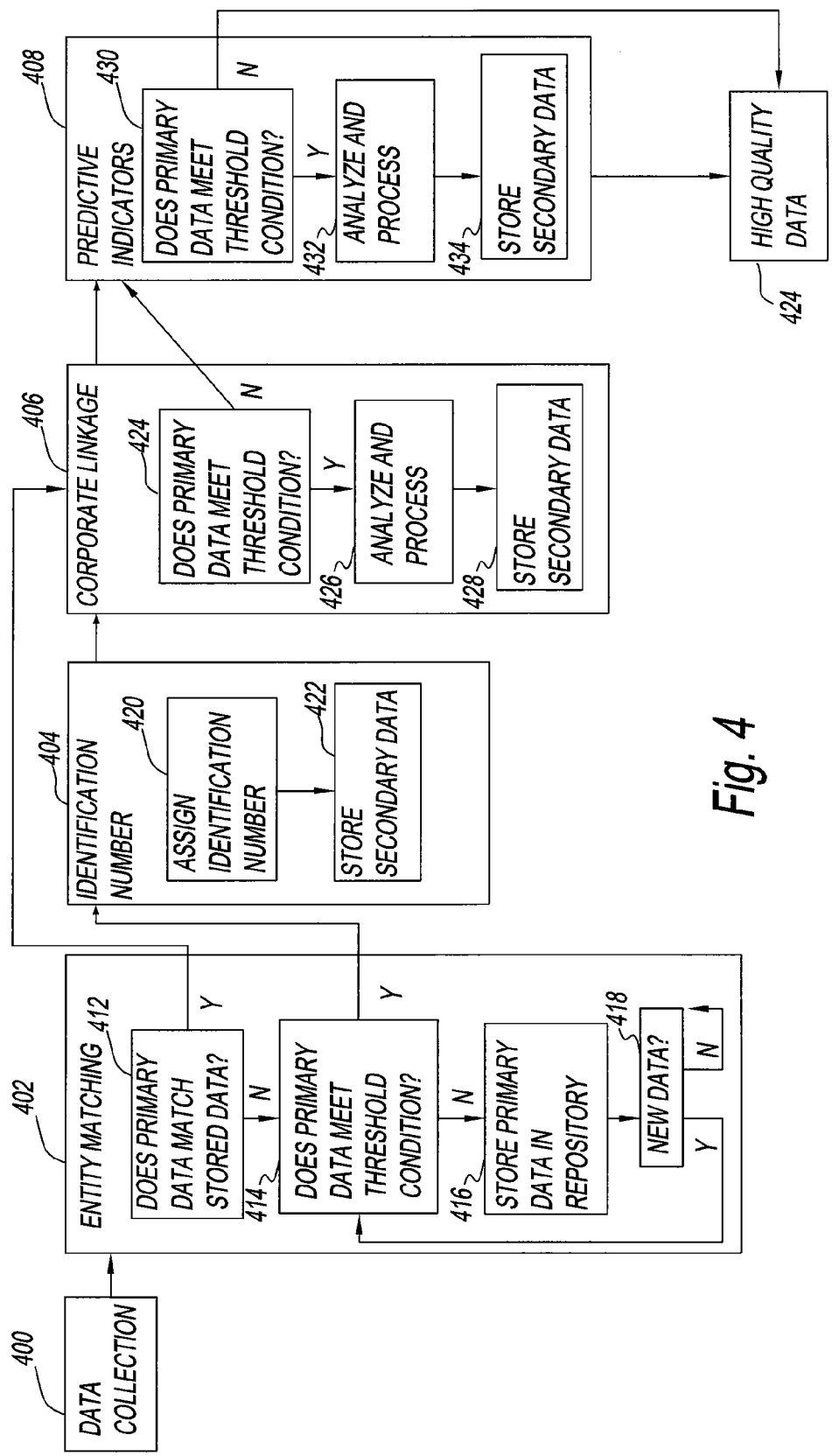
FIG. 4 is a logic diagram depicting the method of data integration according to the present invention.

FIG. 4 shows another embodiment of a method of data integration according to the present invention. This method includes five main components of data integration: data collection 400, entity matching 402, identification number 404, corporate linkage 406, and predictive indicators processing 408 to produce high quality data 410. Data collection 400 gathers primary data. The primary data is tested for accuracy and processed to produce secondary data. Processing primary data includes performing corporate linkage 406 and providing predictive indicators 408. Then, the combined primary and secondary data is provided as enhanced business information or high quality data 410. The primary and secondary data is sampled periodically and evaluated against predetermined conditions. As a result, testing and processing is adjusted to assure quality.

Testing primary data includes determining if primary data matches previously stored data 412 in entity matching 402. If a match is found, then corporate linkage 406 is performed. If no match is found, then testing includes determining if the primary data meets a first threshold condition 414, such as when at least two sources confirm that a business associated with the primary data exists. If the primary data meets the first threshold condition, then control goes to the identification number component 404 where an identification number is assigned 420 and secondary data is stored 422. The identification number uniquely identifies a business, is used once, and not recycled. If the primary data does not meet the first threshold condition, then the primary data is stored in a repository 416 until new data becomes available 418. Once new data is received, testing includes determining if the primary data together with the new data meet the first threshold condition. If so, an identification number is assigned and secondary data is stored.

Performing corporate linkage 406 includes determining if the primary data meets a second threshold condition 424, such as a predetermined sales volume. If so, the primary data is analyzed and processed 426 and secondary data is stored 428 to associate a corporate family with the primary data. The corporate family is updated after a merger or acquisition. If the primary data does not meet the second threshold condition, then control goes to predictive indicators component 408.

Providing predictive indicators 408 includes determining if the primary data meets a third threshold condition 430, such as a predetermined level of customer inquiry. If so, the primary data is analyzed and processed 432 and secondary data is stored 434 to produce predictive indicators, such as a descriptive rating, a score, or a demand estimator.

Thus, the five main components or drivers work together to integrate the data collected into enhanced data useful for making business decisions. Each of the five drivers is examined in more detail below, starting with data collection driver 108.

Figure 5:
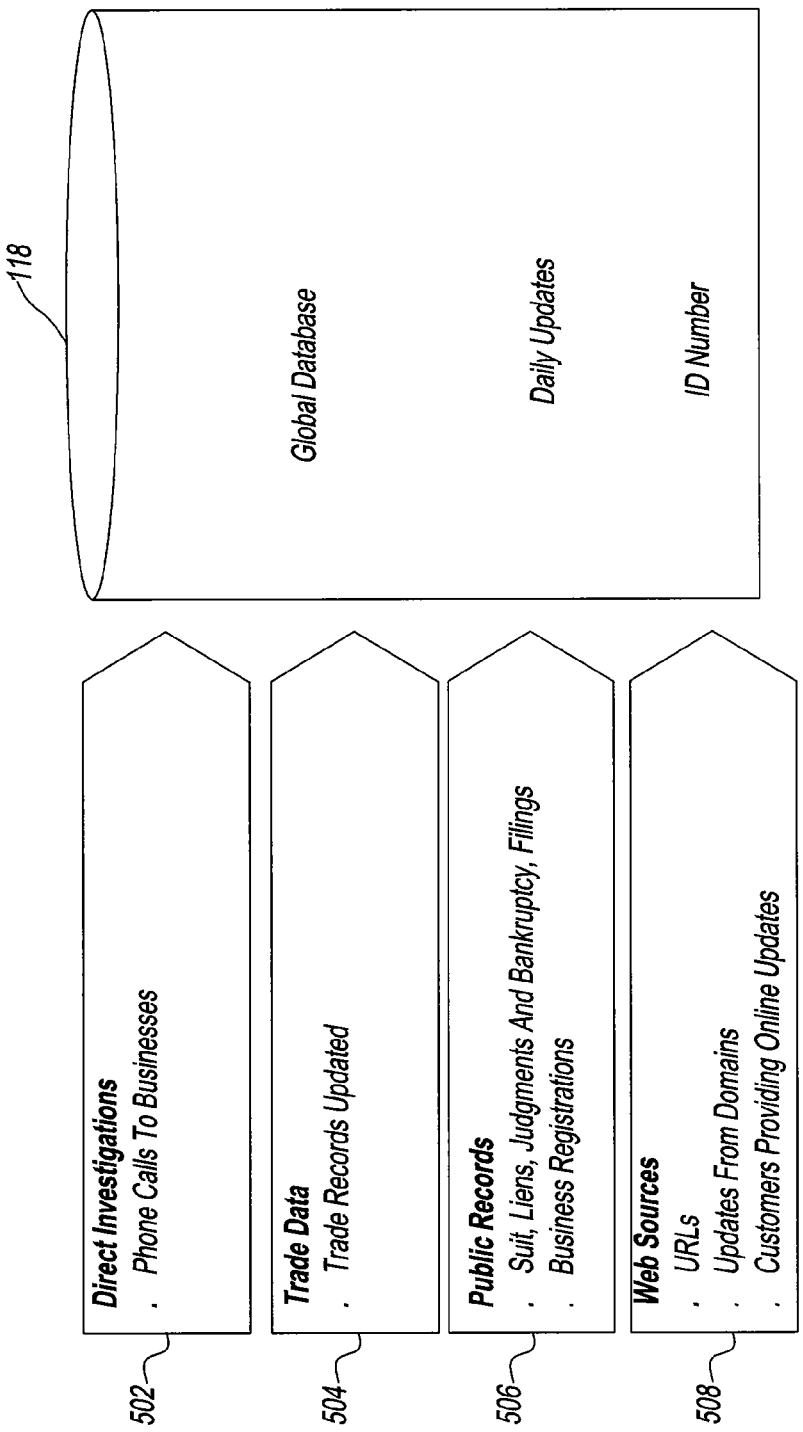
FIG. 5 is a block diagram of example sources of data collection according to the present invention.

FIG. 5 shows some sources of data used in data collection driver 108. Data is collected about customers, prospects, and suppliers with the goal of collecting the most complete data possible. Some sources of data are direct investigations 502, trade data 504, public records 506, and web sources 508, among others. Direct investigations 502 includes making phone calls to businesses. Trade data 504 includes updating trade records. Public records 506 includes suits, liens, judgments, and bankruptcy filings, as well as business registrations and the like. Web sources 508 includes uniform resource locators (URLs), updates from domains, customers providing online updates, and other web data from the Internet.

Web data comprises information from "Whois" files and information from a central repository for registered domains called the VeriSign Registry as well as other data. Whois is a program that will tell you the owner of any second-level domain name who has registered it with VeriSign. VeriSign is a company headquartered in Mountain View, Calif. The base reference file of domain names is matched to the identification number and expanded through data mining. Some uniform resource locators (URLs) are manually assigned to matches. Information from "Whois" files and data mining are matched to data in database 118. The base reference file is enhanced by data mining for additional web site data, such as status, security data, certificate data and other data.

The file coverage is expanded. All matches of identification numbers and URLs are rationalized. One-up, one-down linkage is used to expand URL coverage across family tree members. URLs are sequenced based on status and match type. A certain number, say the top five, of URLs or domains are included in output files. Another output file is created with all the URLs and matched identification numbers (no linkage).

URL base file data elements include URL/domain name, match code, status indicator, redirect indicator, and total number URLs per identification number. The match code is matched to the site or an affiliate. The status indicator is live, under construction, etc. The redirect indicator is the actual URL listed if redirected to another site.

There are also URL plus file elements, which are in a file separate from the URL base file. It includes all URLs and data from the URL base file, summary data on website sophistication, and security on active/live URLs. It also includes total number of external and internal links, meta tag indicator, security indicators, strength of encryption, such as presence secure sockets layer (SSL), and certificate indicators.

URL plus expanded elements are stand-alone files separate from the URL base URL and URL plus files. They include all URL base and URL plus data with live URLs, detail data on website sophistication, and security. They include secured web server type, certificate issuer company, owner flag, which is certificate owner or certificate utilizer, number of certificate users, a number of external URL links, say five, and meta data, such as keywords, description, author, and generator.

Figure 6:
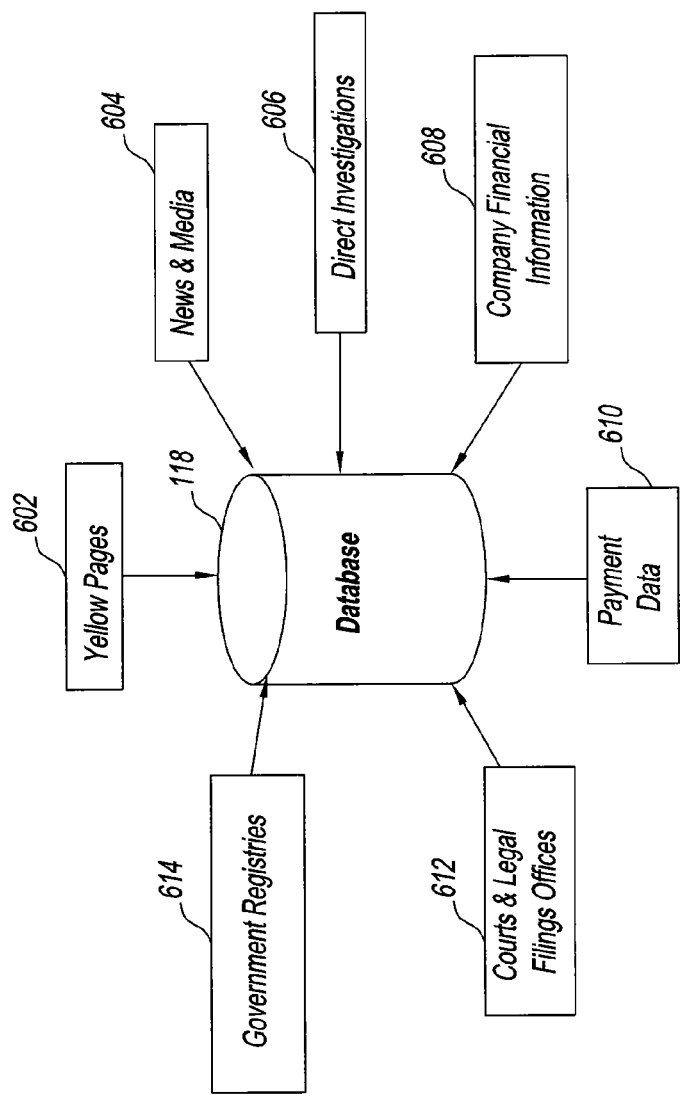
FIG. 6 is a block diagram of more example sources of data collection according to the present invention.

FIG. 6 shows some additional sources of data used by data collection driver 108 for increased accuracy, such as phone directories or yellow pages 602, news and media 604, direct investigations 606, company financial information 608, payment data 610, courts and legal filings offices 612, and government registries 614. This completeness of information aids profitable business decisions. In risk management, a user assesses risk from non-United States (U.S.) companies with the resulting information. Risk from small business customers can be more completely identified. The user can make more informed risk decisions when they are based on more complete information. In sales and marketing, the user can identify new prospects from data drawn from multiple sources. The user can gain access to international customers and prospects and cherry pick a prospect list with value-added information such as standard industrial classification (SIC) and contact name. In supply management, the user may assess risk from foreign suppliers with the resulting information and identify the risk from suppliers more completely. The user gains a fresher more complete picture of each customer, prospect, and supplier because of daily updates to database 118.

Figure 7:
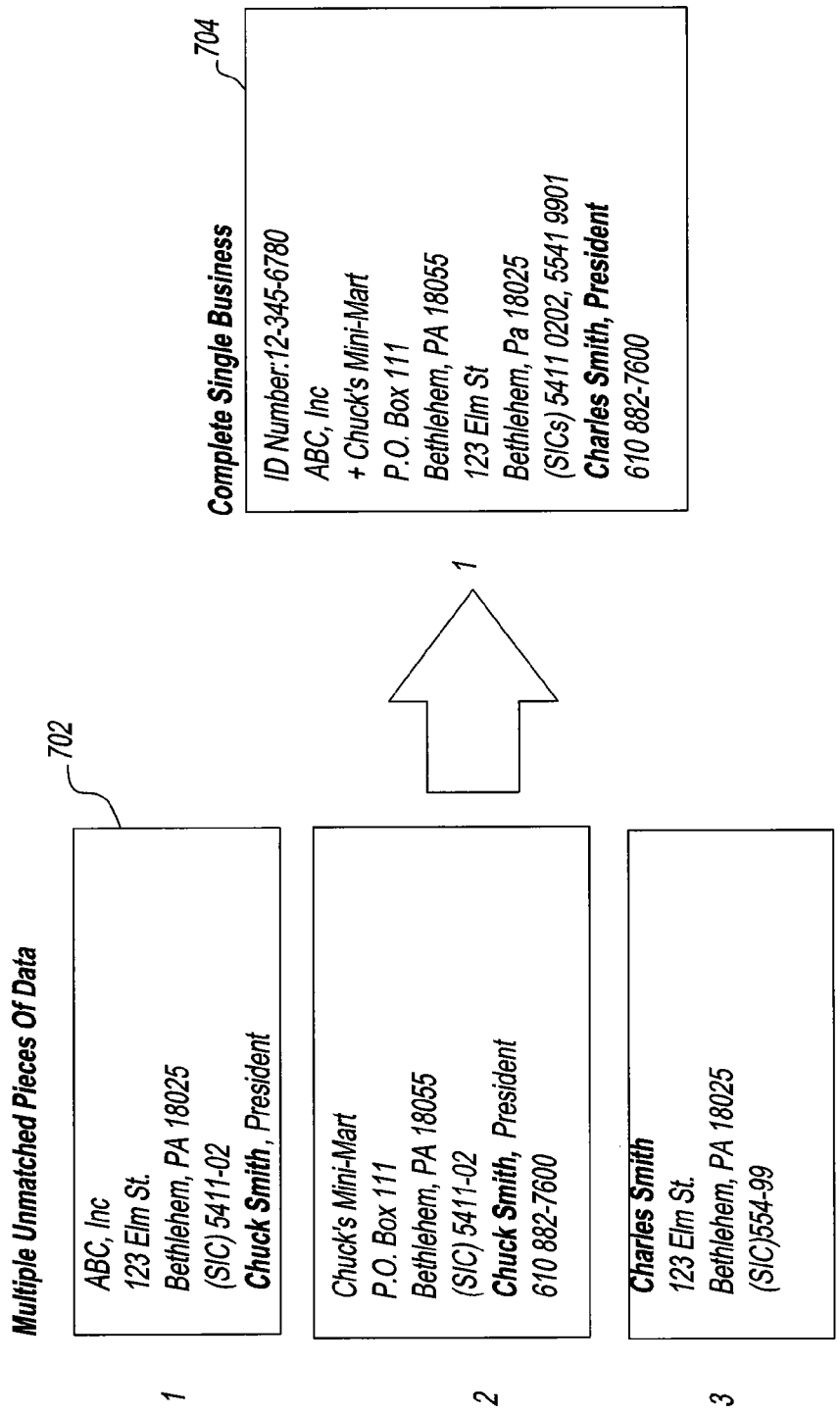
FIGS. 7 and 8 are block diagrams of entity matching according to the present invention.

FIG. 7 shows how multiple unmatched pieces of data 702 may be turned into a complete single business 704. Entity matching driver 110 checks the incoming data 104 to see if it belongs to any existing business in database 118. In this example, ABC, Inc., Chuck's Mini-Mart, and Charles Smith appear to be separate companies, but after entity matching, it is clear that they are all part of one enterprise, ABC Inc. and Chuck's Mini-Mart. The different addresses and other associated information is also reconciled into complete single business 704.

Figure 8:
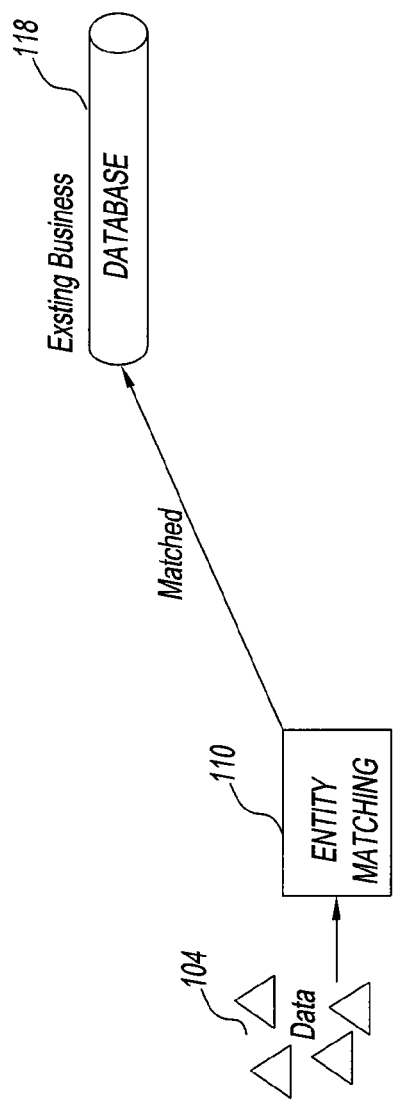
Figure 9:
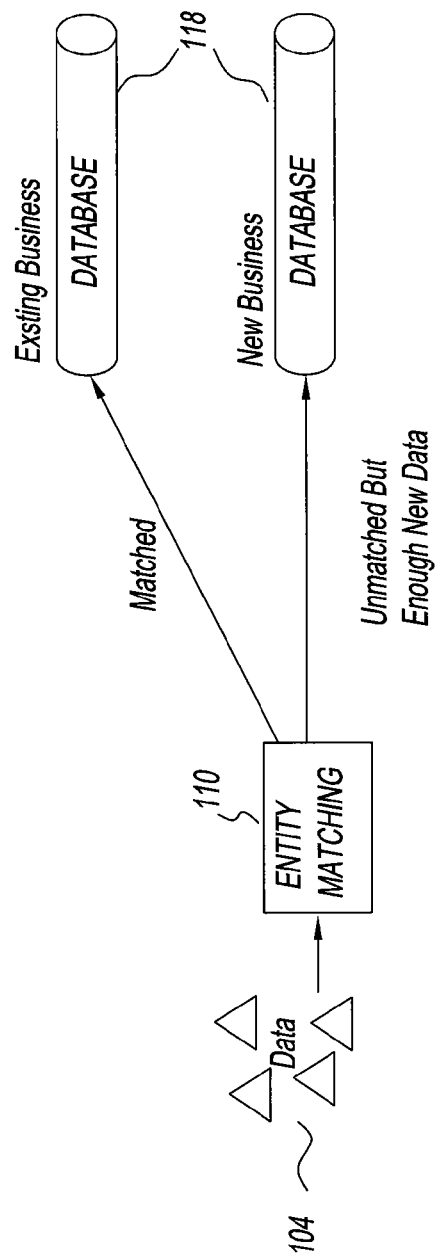
FIG. 9 is a block diagram of entity matching where matched data is delivered to one database and unmatched data is sent for assignment of new corporate identification number according to the present invention.
Figure 10:
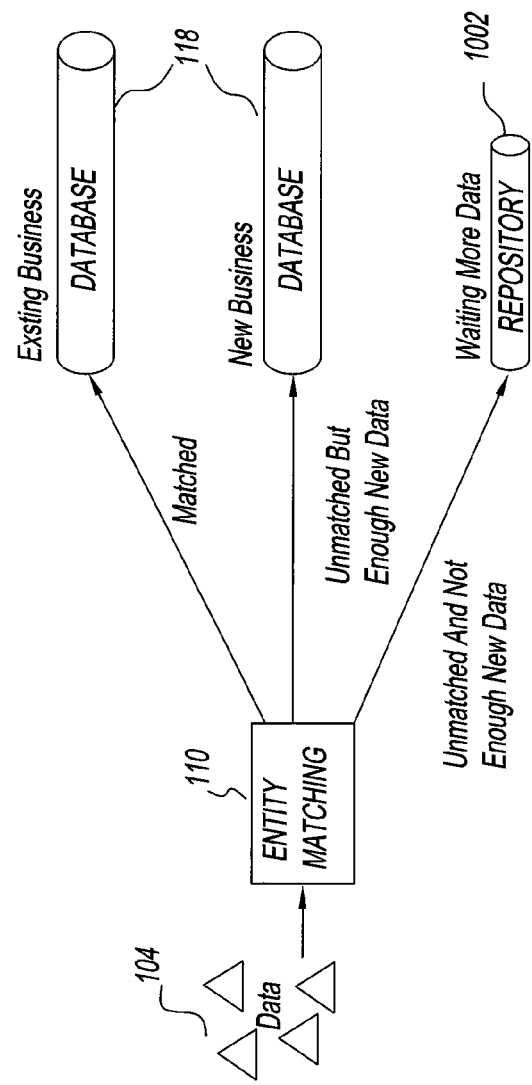
FIG. 10 is a block diagram of entity matching where matched data is delivered to one database and unmatched data is either sent for assignment of new corporate identification number or stored in a database repository until additional data can be gathered according to the present invention.

FIG. 8 shows how incoming data 104 that matches a business in database 118 is appended to that business through entity matching driver 110. Another case is shown in FIG. 9, where incoming data 104 that does not match any business in database 118 is either designated as a new business or, as shown in FIG. 10, is held in a repository 1002 to wait for further data verifying that it is a new business. Entity matching driver 110 is designed to match data to the right business every time, thus, increasing efficiency. Entity matching driver 110 provides more complete and accurate profiles of customers, prospects, and suppliers and ensures far fewer duplicate businesses.

Figure 11:
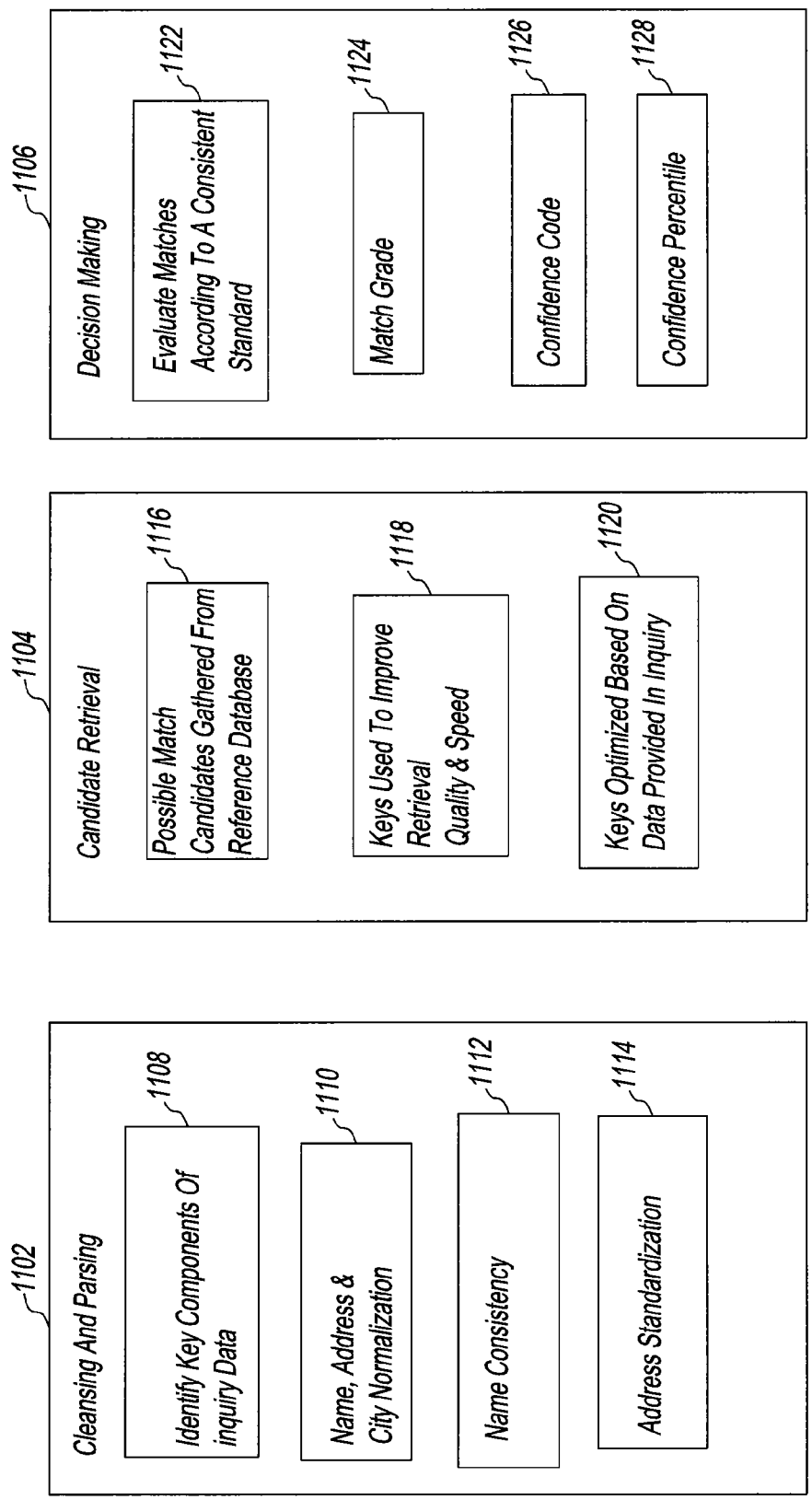
FIGS. 11 and 12 are block diagrams of a method of entity matching according to the present invention.

FIG. 11 shows an example method of matching via match driver 110. This method includes cleaning and parsing 1102, performing candidate retrieval 1104, and decision making 1106. Cleaning and parsing 1102 includes identifying key components of inquiry data 1108, normalizing name, address, and city 1110, performing name consistency 1112, and performing address standardization 1114. Candidate retrieval 1104 includes gathering possible match candidates from a reference database 1116, using keys to improve retrieval quality and speed 1118, and optimizing keys based on data provided in the inquiry data 1120. Decision making 1106 includes evaluating matches according to a consistent standard 1122, applying a match grade 1124, applying a confidence code 1126, and applying a confidence percentile 1128.

Figure 12:
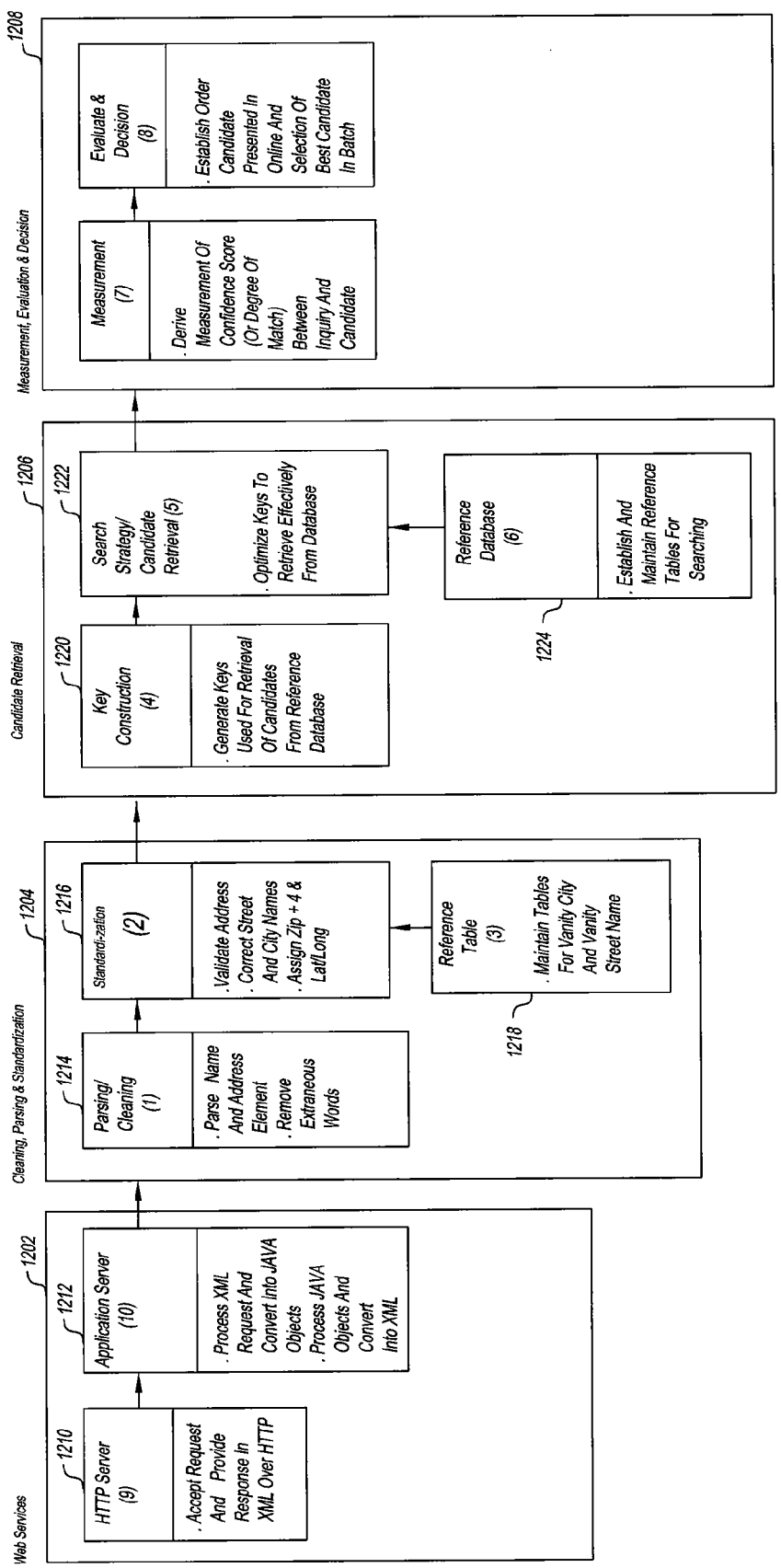

FIG. 12 shows a more detailed method of matching via driver 110. This method includes web services 1202, cleaning, parsing, and standardization 1204, candidate retrieval 1206, and measurement, evaluation, and decision 1208. In web services 1202, an HTTP server accepts a request and provides a response in XML over HTTP 1210 and an application server processes the XML request and converts it into JAVA objects and then processes the JAVA objects and converts them back into XML 1212. In cleaning, parsing, and standardization 1204, name and address elements are parsed and extraneous words are removed 1214. Then, the address is validated to make sure the street and city names are correct and a zip code plus four and a latitude and longitude are assigned 1216. A reference table maintains vanity city and vanity street names 1218. In candidate retrieval 1206, keys are generated for use in retrieval of candidates from the reference database 1220. Then, keys are optimized for effective database retrieval in search strategy and candidate retrieval 1222. Reference tables are established and maintained for searching a reference database 1224. In measurement, evaluation, and decision 1208, a measurement of confidence score is derived that indicates the degree of match between the inquiry and candidate. Then, an order for presenting each candidate online is established and the best candidate in the batch is selected. Other methods of performing matching as contemplated by one of ordinary skill in the art are also possible for implementing the present invention.

Identification (ID) number driver 112 appends a unique identification number to every business so it can be easily and accurately identified. One example of the unique identification number is such as the D-U-N-S® Number available from Dun & Bradstreet headquartered in Short Hills, N.J., which is a nine-digit number that allows a business to be easily tracked through changes and updates. The identification number is retained for the life of a business. No two businesses ever receive the same identification number and the identification numbers are never recycled. The identification number is not assigned until multiple data sources confirm that the business exists. The identification number acts as an industry standard for business identification. It is endorsed by the United Nations, the International Standards Organization (ISO), the European Commission, and over fifty industry groups.

The identification number is a central concept in the data processing method according to the present invention. For quality assurance, the identification number allows verification of information at every stage of the process. For data collection driver 108, if data is not linked to an existing identification number, it indicates the possibility of a new business. For entity matching driver 110, the identification number allows new data to be accurately matched to existing businesses. For corporate linkage driver 114, corporate families are assembled based on each business' identification number. For predictive indicators driver 116, the identification number is used to build predictive tools.

Additionally, the identification number opens new areas of opportunity to a user's business by helping to verify that a business exists. Users are provided a complete view of prospects, customers, and suppliers. Existing data is clarified, duplication is eliminated, and related businesses are shown to be related. Users can more easily manage large groups of customers or suppliers when the identification number is appended to the user's information. The identification number enables fast and easy data updates when appended to the user's information.

Figure 13:
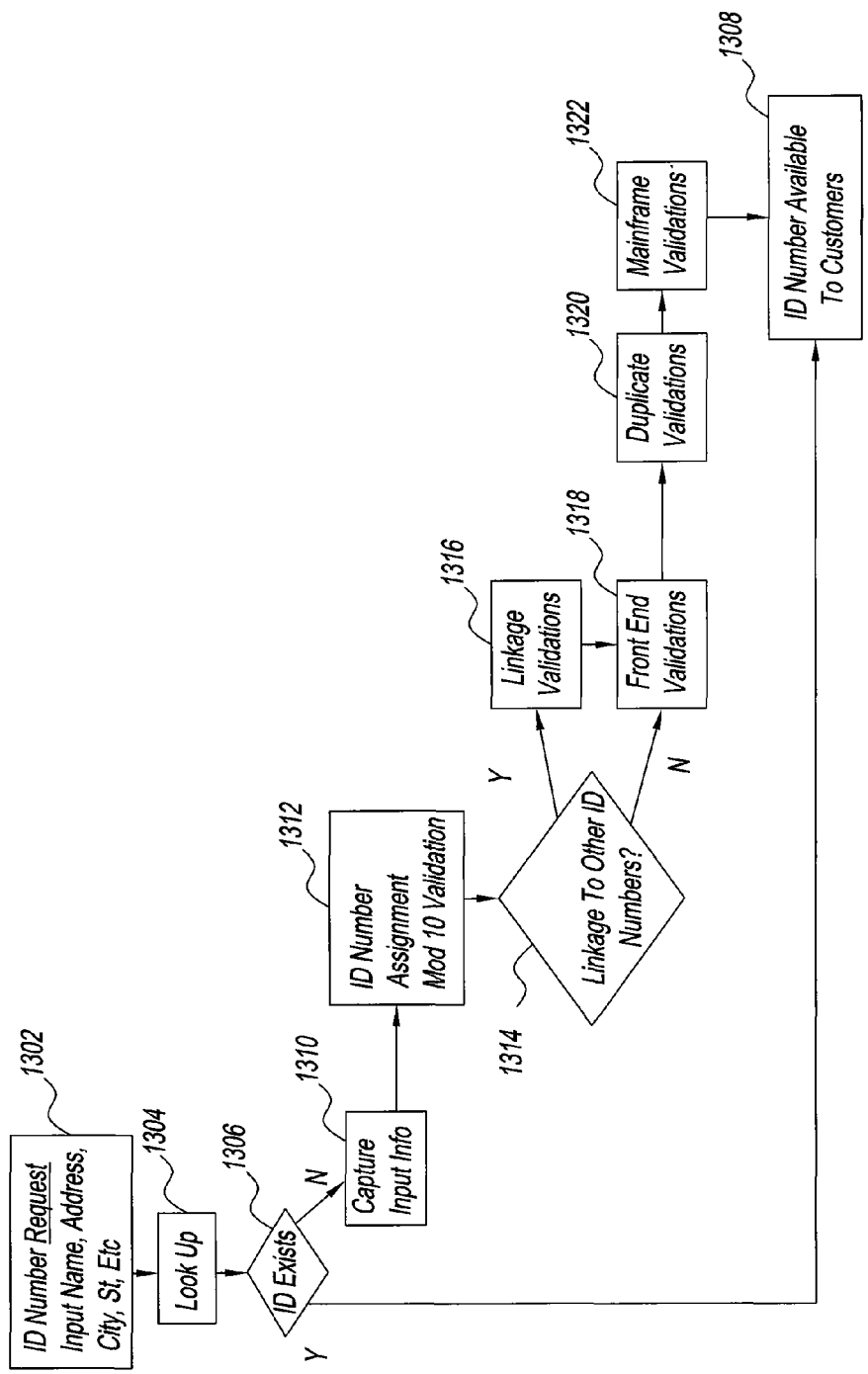
FIG. 13-16 are block diagrams of corporate linking according to the present invention.

FIG. 13 shows an example method of identification number driver 112. The process starts with an identification number request 1302, including input name, address, city, state, etc. For example, when a record is being created for a new business that does not yet exist in database 118, an identification number is requested. In look up operation 1304, the database 118 is searched for the identification number in the request. If it is found 1306, then the identification number is made available to customers 1308. Otherwise, the input from the request is captured 1310 and an identification number is assigned, including a Mod 10 validation 1312. Mod 10 validation assigns a check digit at the end to keep numbers clean. In the linkage to other identification numbers step 1314, if there is linkage then it is validated 1316 before front end validations are performed 1318. Then, duplicate validations 1320 and mainframe validations 1322 are performed, and the identification number is made available to customers 1308. Linkage validation prevents errors, such as a branch linked to another branch.

Figure 14:
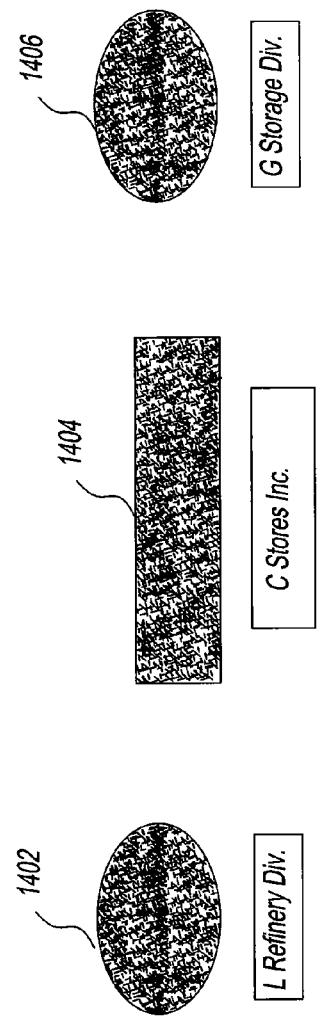
Figure 15:
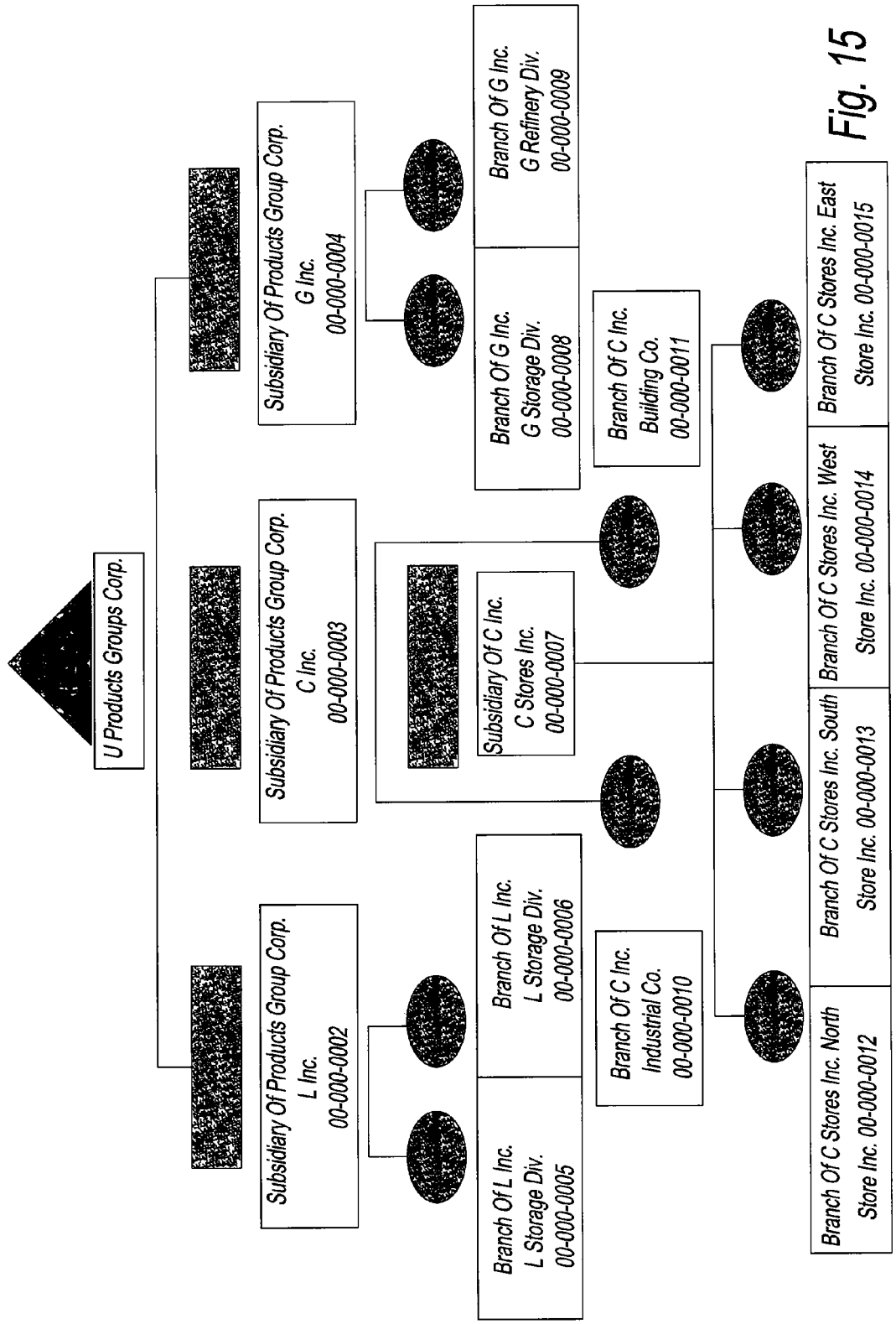
Figure 16:
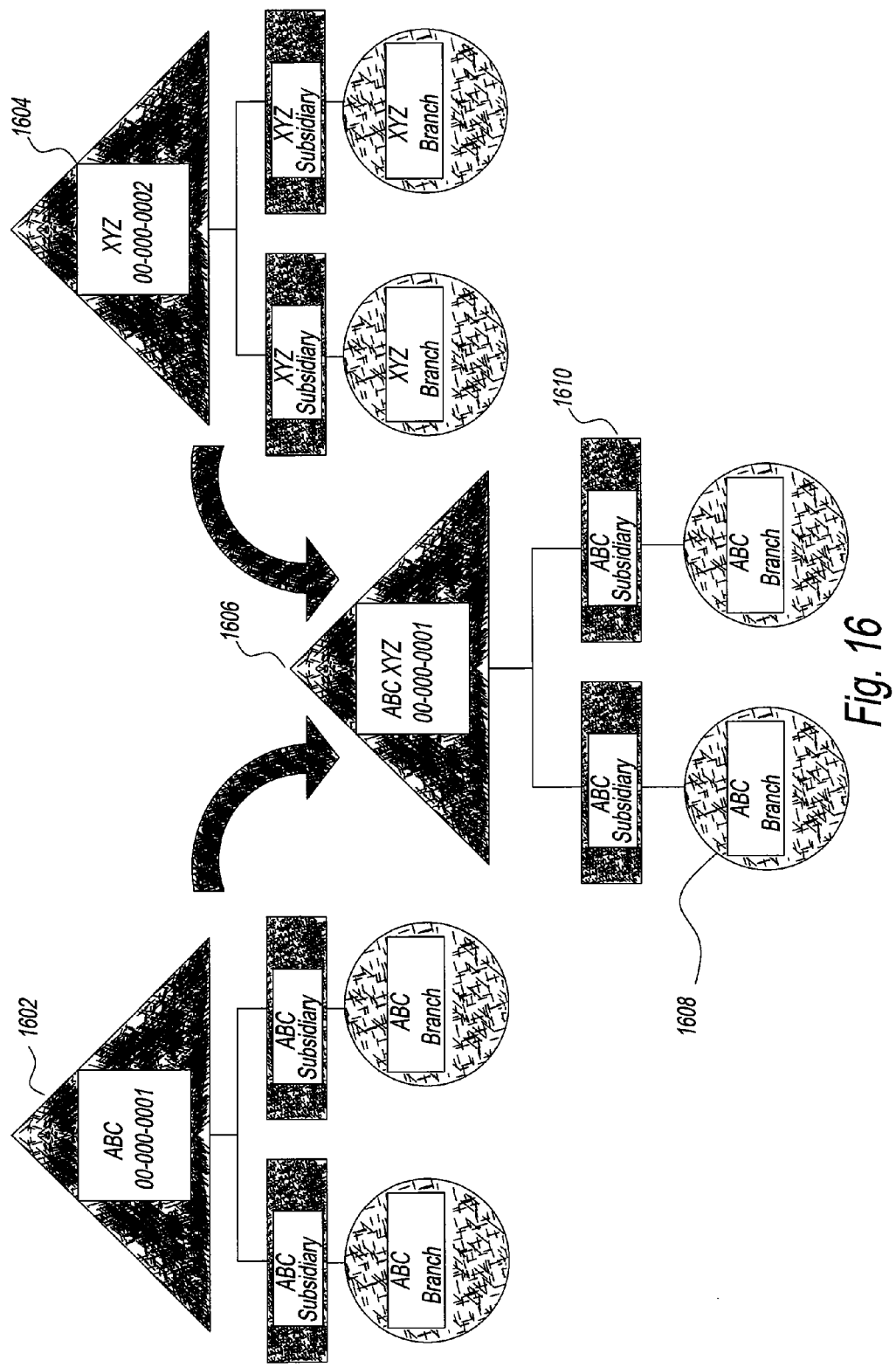

FIGS. 14-16 show how corporate linkage driver 114 builds corporate linkage to reveal how companies are related. Without corporate linkage, the companies, L Refinery Div. 1402, C Stores Inc. 1404, and G Storage Div. 1406 in FIG. 14 appear to be unrelated.

As shown in FIG. 15, however, applying corporate linkage allows the entire corporate family to be viewable without limit in depth or breadth. Parent company U Products Group Corp. 1502 and has three subsidiaries under it, L Inc. 1504, C Inc 1506, and G Inc. 1508. L Inc. 1504 has two branches, L Storage Div. 1510 and L Refinery Div. 1402 (shown in FIG. 14). C Inc. 1506 has two branches, Industrial Co. 1512 and Building Co. 1514 and a subsidiary, C Stores Inc. 1404 (shown in FIG. 4). G Inc. 1508 has two branches, G Storage Div. 1406 (shown in FIG. 14) and G Refinery Div. 1516. C Stores Inc. has four branches, North Store Inc. 1518, South Store Inc. 1520, West Store Inc. 1522, and East Store Inc. 1524. Building extensive corporate linkage allows a business information provider to be an industry leader by providing this complete detail.

FIG. 16 shows how corporate linkage driver 114 updates family trees after mergers and acquisitions. In this example, two separate businesses, ABC 1602 and XYZ 1604 exist before a merger and each have their own subsidiaries and branches. After the merger, ABC XYZ 1606 has two subsidiaries, ABC subsidiary 1608 and XYZ subsidiary 1610, each with their own branches and/or subsidiaries.

Corporate linkage driver 114 opens up profitable opportunities in risk management, sales and marketing, and supply management for a user. It allows the user to understand the total risk exposure to a corporate family. The user recognizes the relationship between bankruptcy or financial stress in one company and the rest of its corporate family. The user can find incremental opportunities with new and existing customers within a corporate family and understand who its best customers and prospects are. The user can determine its total spend with a corporate family to better negotiate.

Figure 17:
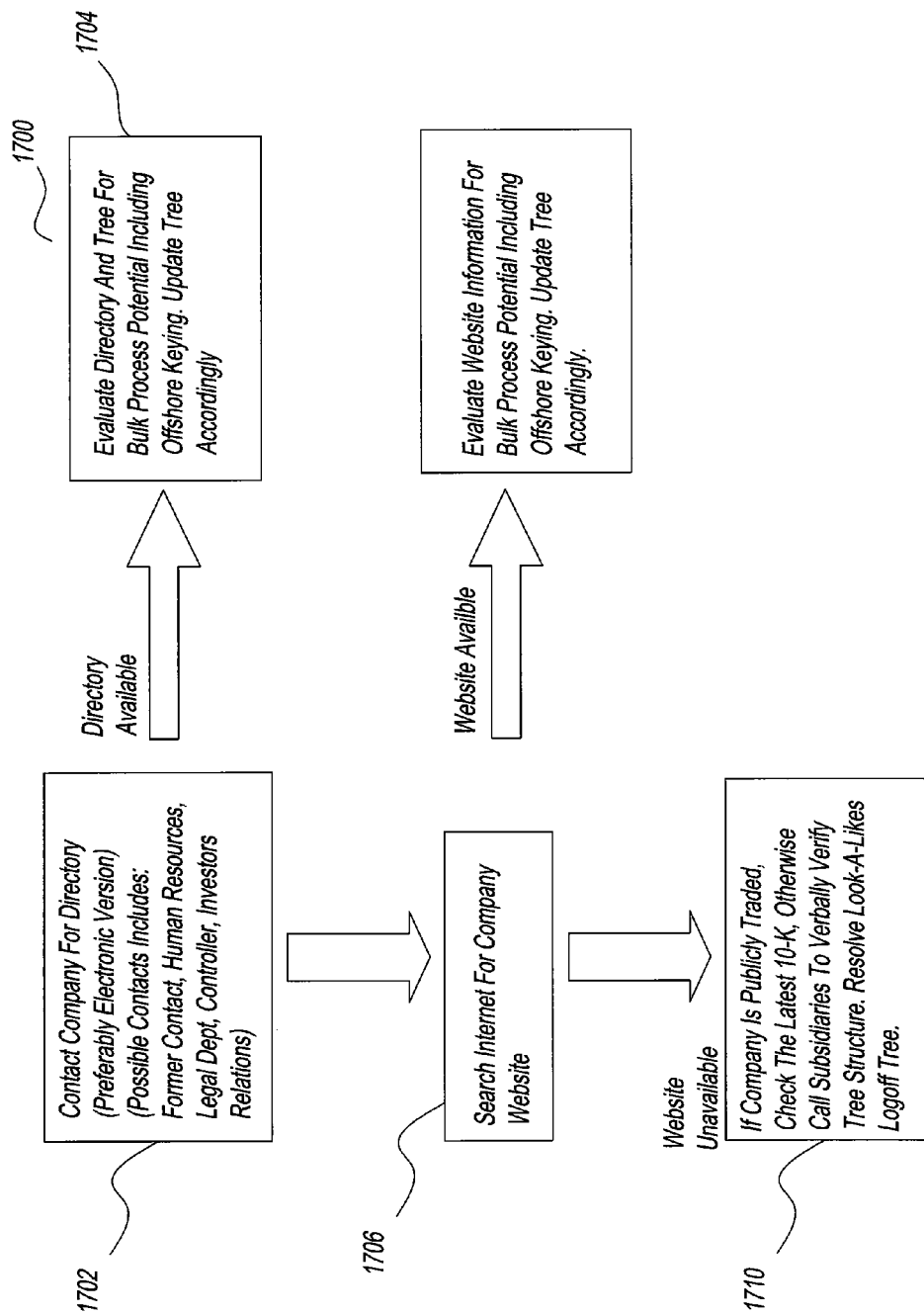
FIG. 17 is a logic diagram of an example method of performing corporate linkage according to the present invention.

FIG. 17 shows an example method of performing corporate linkage driver 114. Generally, it shows a method of updating family tree linkage 1700 where the goal is to correctly link all subsidiaries and branches of each entity having an identification number with consistent names, tradestyles, and correct employee numbers, while resolving all look-a-likes (LALs).

For example, file building and other activities could create records not originally linked, e.g., duplicate records or look-a-likes (LALs) that need to be resolved. For example, if someone created a record on LensCrafters but called it LensCrafters EyeGlasses when it was LensCrafters USA, then you might have a look-a-like or duplicate record. To prevent this, method 1700 resolves look-a-like records. There are three general rules for resolving look-a-like records. First, if a look-a-like is on a directory or can be verbally confirmed at headquarters, then it is linked accordingly. Second, unconfirmed look-a-likes require a phone investigation. Third, all look-a-likes must be resolved prior to tree logoff regardless of the cooperation level.

At the start of method 1700, a company is contacted for a directory 1702, preferably an electronic version. Possible contacts include former contact, human resources, legal department, controller, investor relations, and the like. If a directory is available, the directory and tree for bulk process potential are evaluated including offshore keying 1704. Then, the tree is updated accordingly. On the other hand, if the directory was unavailable, the Internet is searched for a company website 1706. If the website is available, the website information is evaluated for bulk process potential including offshore keying and the tree is updated accordingly 1708. If the website is unavailable, it is determined if the company is publicly traded 1710. If so, the latest 10-K is checked. Otherwise, subsidiaries are called to verbally verify the tree structure. Look-a-likes are resolved and tree logoff is performed.

Predictive indicator driver 116 summarizes the information collected on a business and uses it to predict future performance. There are three types of predictive indicators: descriptive ratings, predictive scores, and demand estimators. Descriptive ratings are an overall descriptive grade of a company's past performance. Predictive scores are a prediction of how likely it is for a business to be creditworthy in the future. Demand estimators estimate how much of a product a business is likely to buy in total.

Predictive indicators help a user to accelerate all areas of its business. In risk management, descriptive ratings help the user grant or approve credit. A rating indicates creditworthiness of a company based on past financial performance. A score indicates creditworthiness based on past payment history. Predictive scores can be applied across the user's whole portfolio to quickly identify high-risk accounts and begin aggressive collection immediately. A commercial credit score predicts the likelihood of a business paying slow over the next twelve months. A financial stress score predicts the likelihood of a business failing over the next twelve months. In sales and marketing, demand estimators let a user know who is likely to buy so that it can prioritize opportunities among customers or prospects. Examples of demand estimators include number of personal computers and local or long distance spending. In supply management, predictive scores can be applied to all of a user's suppliers to quickly understand their risk of failing in the future.

In addition, predictive scores may be customized according to a user's specific need and criteria. For example, criteria may be used, such as (1) what behavior does the user want to predict; (2) what is the size of the business the user wants to assess; and (3) what are the decision rules based on the user's risk tolerance to translate risk assessment in to a credit decision or risk management action.

Predictive indicators are enabled by analytic capability and data capability. For example, a dedicated team of experienced business-to-business (B2B) expert PhDs may build the underlying predictive models and have access to industry-specific knowledge, financial and payment information, and extensive historical information for analysis.

Figure 18A:
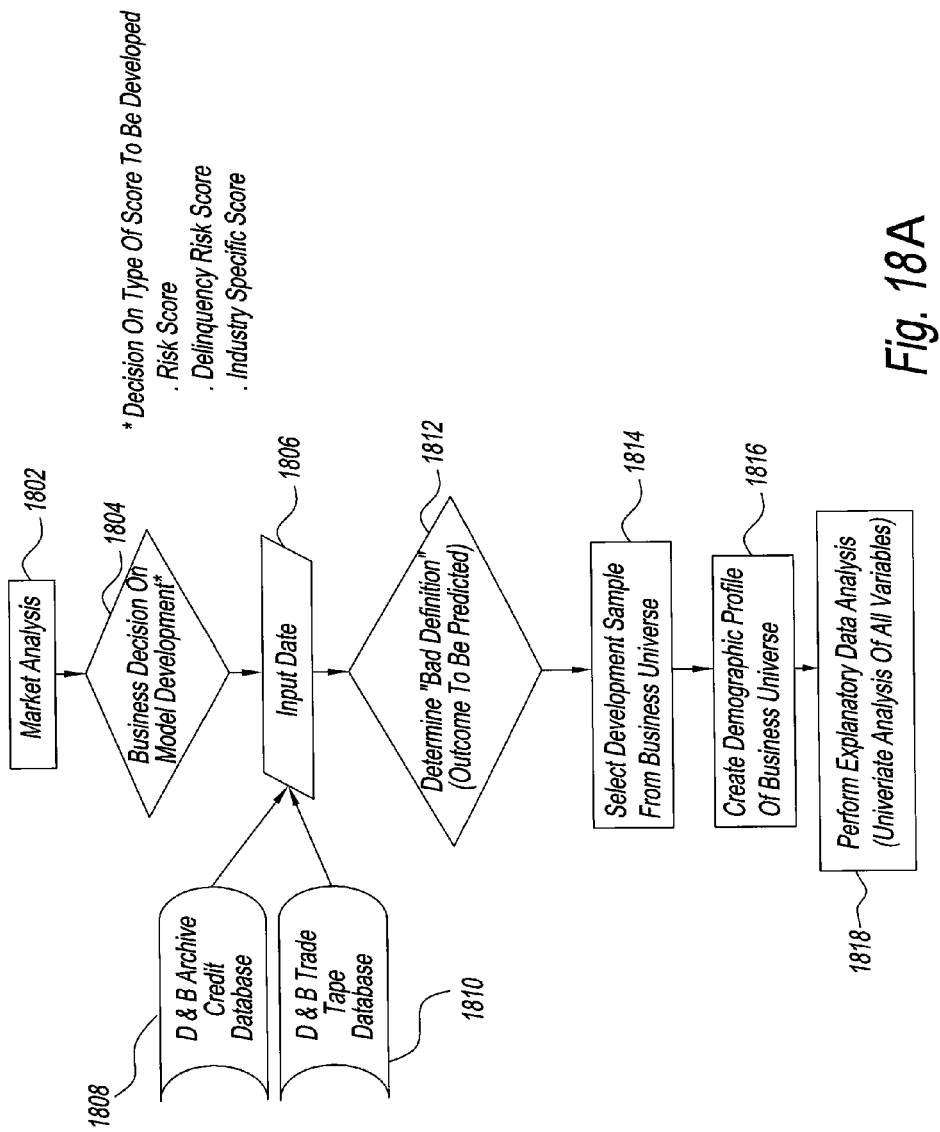
FIGS. 18A and 18B are block diagrams of an example method of providing a predictive indicator according to the present invention.
Figure 18B:
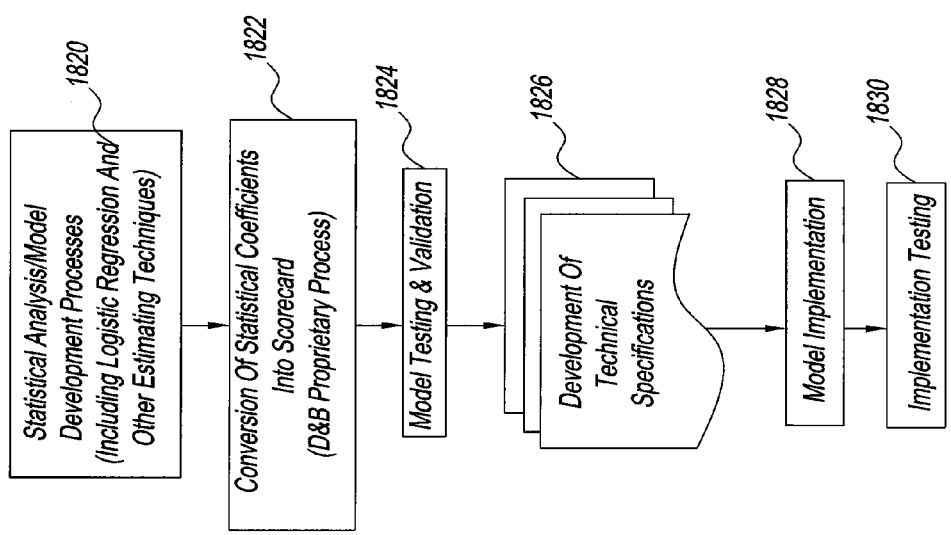

FIGS. 18A and 18B show an example method of creating a predictive indicator. It starts with market analysis 1802 and then there is a business decision on model development 1804. This decision involves the type of score to be developed and output at the end, such as a failure risk score, a delinquency risk score, or an industry specific score. The failure risk score is the likelihood that a company will cease operations. The delinquency risk score is the likelihood that a company will pay late. The industry specific score predicts something particular, such as the likelihood of using copiers or truckers or whether a company is a good credit risk. Input data 1806 is gathered from an archive of credit database 1808 and a trade tape database 1810 which provide historical data related to credit. There are two time periods of concern, an activity period which is a look historically at all the facts and a resulting period which is a time period just after that to see what happened. For example, given data in the previous year, how did a company perform with respect to a certain time period in the current year. The next step, determine "bad definition" (outcome to be predicted) refers to a risk to be evaluated, such as a financial stress score that predicts the likelihood of a negative failure in the next twelve months.

A development sample is selected from a business universe 1814, a demographic profile is created of the business universe 1816, and explanatory data analysis is performed 1818 (univariate analysis of all variables. Tasks are performed such as determining the range of a variable, the type of variable, including or not including variables, and other functions related to understanding what to put in the model. Variables may be selected in accordance with the activity period and the resulting period and weights may be assigned to indicate accuracy or representativeness. Trends are factored in. Quality assurance includes periodically checking to see if anything in the business universe effects the initial model and to take a score and run it against a prior period to check that it is still indicative or predictive. Samples may have flaws.

Continuing on FIG. 18B, statistical analysis and model development processes including logistic regression and other estimating techniques 1820 are performed. This step includes applying the appropriate models, formulas, and statistics. Next, statistical coefficients are converted into a scorecard 1822. Models are tested and validated 1824, and technical specifications are developed 1826. Finally, the model is implemented 1828 and tested 1830. Data is run through the model to generate a score. Periodically, checks are performed to verify that the score is still valid and to determine if the scorecard needs to be updated.

It is to be understood that the above description is intended to be illustrative and not restrictive. Many other embodiments will be apparent to those of skill in the art upon reviewing the above description. Various embodiments for performing data collection, performing entity matching, applying an identification number, performing corporate linking, and providing predictive indicators are described. The present invention has applicability to applications outside the business information industry. Therefore, the scope of the present invention should be determined with reference to the appended claims, along with the full scope of equivalents to which such claims are entitled.

What is claimed is:

1. A computer implemented method for ensuring quality of processed corporate entity data, said method comprising:
   sequentially processing said corporate entity data through a series of serially connected drivers, said serially connected drivers comprise:
   (a) a data collection driver that merges said corporate entity data from a plurality of sources,
   (b) an entity matching driver that matches said corporate entity data with a stored identification number,
   (c) an identification number driver that assigns an identification number to the corporate entity data that was number matched in by the entity matching driver,
   (d) a corporate linkage driver that builds corporate families based upon said corporate entity data, and (e) a predictive indicator driver that uses statistical analysis to rate an entity's past performance to indicate a likelihood that said entity will perform a same way in the future; and conducting a quality assurance of said corporate entity data as it is processed in each of said driver, wherein said quality assurance comprises:

sampling said corporate entity data from each said driver periodically, thereby generating sample data;

evaluating said sample data; and adjusting said processing of at least one of said drivers based upon said evaluating, thereby producing high quality data.

2. The method according to claim 1, wherein said evaluating of said sample data consists of at least one step selected from the group consisting of: auditing, validating, normalizing, correcting, and updating of said corporate entity data.

3. A computer implemented method for ensuring quality of processed corporate entity data, said method comprising:

sequentially processing said corporate entity data through a series of serially connected drivers, said serially connected drivers comprise a data collection driver, an entity matching driver, an identification number driver, a corporate linkage driver, and a predictive indicator driver; and conducting a quality assurance of said corporate entity data as it is processed in each of said driver, wherein said quality assurance comprises:

sampling said corporate entity data from each said driver periodically, thereby generating sample data;

evaluating said sample data; and adjusting said processing of at least one of said drivers based upon said evaluating, thereby producing high quality data, wherein said corporate entity data is initially processed through said data collection driver to produce primary corporate entity data, said primary corporate entity data is then processed by said entity matching driver, said primary corporate entity data is processed by said entity matching driver where if not matched to previously stored data, then the unmatched primary corporate entity data is sent to said identification number driver where an identification number is assigned thereto, and if matched to said previously stored data, then the matched primary corporate entity data from said entity matching driver and primary corporate entity data having an assigned identification number applied in said identification number driver are processed by said corporate linkage driver, and thereafter said primary corporate entity data from said corporate linkage driver is processed by said predictive indicator driver.

4. A computer system for ensuring the quality of processed corporate entity data, said system comprising:

a data collection driver that merges said corporate entity data from a plurality of sources;

an entity matching driver that matches said corporate entity data with a stored identification number;

an identification number driver that assigns an identification number to the corporate entity data that was number matched in by the entity matching driver;

a corporate linkage driver that builds corporate families based upon said corporate entity data;

a predictive indicator driver that uses statistical analysis to rate an entity's past performance to indicate a likelihood that said entity will perform a same way in the future; and a processor which sequentially filters said corporate entity data through the serially connected data collection driver, entity matching driver, identification number driver, corporate linkage driver, and predictive indicator driver, and wherein said processor conducts a quality assurance of said corporate entity data as it is processed in each of said driver, wherein said quality assurance comprises:

sampling said corporate entity data from each said driver periodically, thereby generating sample data;

evaluating said sample data; and adjusting said processing of at least one of said drivers based upon said evaluation, thereby producing high quality data.

5. The system according to claim 4, wherein said evaluating of said sample data consists of at least one step selected from the group consisting of: auditing, validating, normalizing, correcting, and updating of said corporate entity data.

6. A computer system for ensuring the quality of processed corporate entity data, said system comprising:

a data collection driver;
an entity matching driver;
an identification number driver;
a corporate linkage driver;
a predictive indicator driver; and
a processor which sequentially filters said corporate entity data through the serially connected data collection driver, entity matching driver, identification number driver, corporate linkage driver, and predictive indicator driver, and wherein said processor conducts a quality assurance of said corporate entity data as it is processed in each of said driver, wherein said quality assurance comprises:

sampling said corporate entity data from each said driver periodically, thereby generating sample data;

evaluating said sample data; and adjusting said processing of at least one of said drivers based upon said evaluation, thereby producing high quality data, wherein said processor:

processes said corporate entity data through said data collection driver to produce primary corporate entity data, processes said primary corporate entity data by said entity matching driver to determine if an identification number has been previously assigned to said primary corporate entity data, if said corporate entity data was not previously assigned said identification number, then the unmatched primary corporate entity data is sent to said identification number driver where an identification number is assigned thereto, and if said corporate entity data was previously assigned said identification number, then the matched primary corporate entity data from said entity matching driver and primary corporate entity data having an assigned identification number applied in said identification number driver are processed by said corporate linkage driver, and processes said primary corporate entity data from said corporate linkage driver by said predictive indicator driver.

7. A machine-readable medium storing executable instructions for data integration, the instructions comprising:

sequentially processing said corporate entity data through a series of serially connected drivers, said serially connected drivers comprise:

(a) a data collection driver that merges said corporate entity data from a plurality of sources, (b) an entity matching driver that matches said corporate entity data with a stored identification number, (c) an identification number driver that assigns an identification number to the corporate entity data that was number matched in by the entity matching driver, (d) a corporate linkage driver that builds corporate families based upon said corporate entity data, and (e) a predictive indicator driver that uses statistical analysis to rate an entity's past performance to indicate a likelihood that said entity will perform a same way in the future; and conducting a quality assurance of said corporate entity data as it is processed in each of said driver, wherein said quality assurance comprises:

sampling said corporate entity data from each said driver periodically, thereby generating sample data;

evaluating said sample data; and adjusting said processing of at least one of said drivers based upon said evaluation, thereby producing high quality data.

8. The machine-readable medium according to claim 7, wherein said evaluating of said sample data consists of at least one step selected from the group consisting of: auditing, validating, normalizing, correcting, and updating of said corporate entity data.

9. A machine-readable medium storing executable instructions for data integration, the instructions comprising:

sequentially processing said corporate entity data through a series of serially connected drivers, said serially connected drivers comprise a data collection driver, an entity matching driver, an identification number driver, a corporate linkage driver, and a predictive indicator driver; and conducting a quality assurance of said corporate entity data as it is processed in each of said driver, wherein said quality assurance comprises:

sampling said corporate entity data from each said driver periodically, thereby generating sample data;

evaluating said sample data; and adjusting said processing of at least one of said drivers based upon said evaluation, thereby producing high quality data, wherein said corporate entity data is initially processed through said data collection driver to produce primary corporate entity data, said primary corporate entity data is then processed by said entity matching driver, said primary corporate entity data is processed by said entity matching driver where if not matched to previously stored data, then the unmatched primary corporate entity data is sent to said identification number driver where an identification number is assigned thereto, and if matched to said previously stored data, then the matched primary corporate entity data from said entity matching driver and primary corporate entity data having an assigned identification number applied in said identification number driver are processed by said corporate linkage driver, and thereafter said primary corporate entity data from said corporate linkage driver is processed by said predictive indicator driver.

* * * * *